Sept. 9, 1947.  E. F. REYNOLDS  2,427,160

FENDER SHIELD

Filed Nov. 20, 1944  2 Sheets-Sheet 1

INVENTOR
Edward F. Reynolds
BY
Blackmore, Spencer & Hunt
ATTORNEYS

Sept. 9, 1947.     E. F. REYNOLDS     2,427,160
FENDER SHIELD
Filed Nov. 20, 1944     2 Sheets-Sheet 2
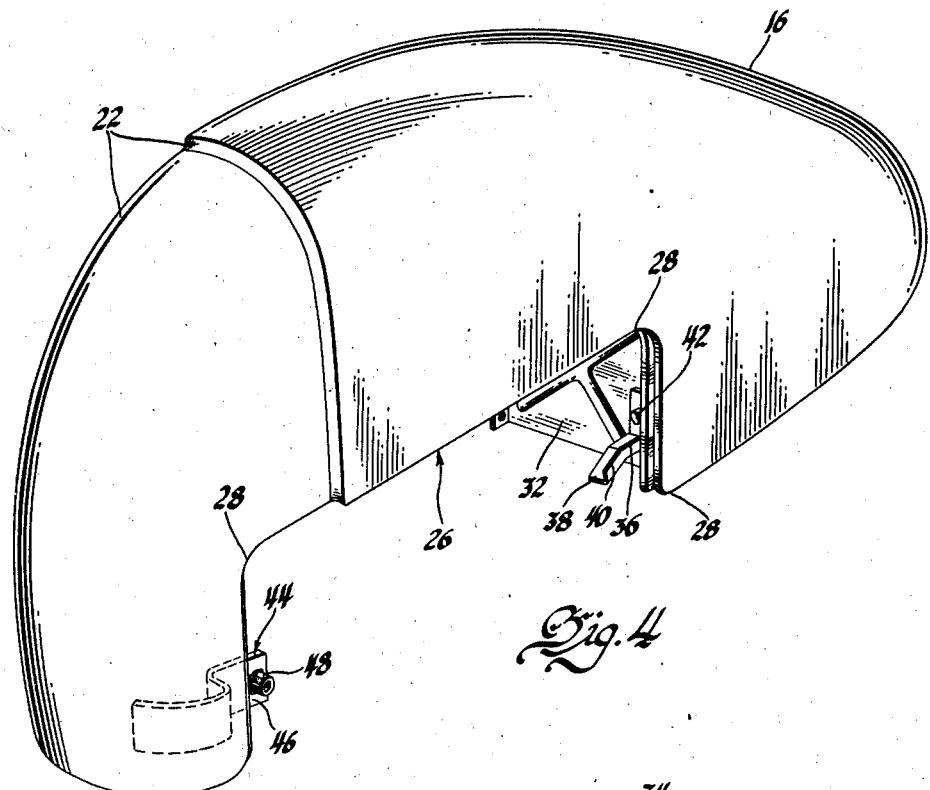
Fig. 4
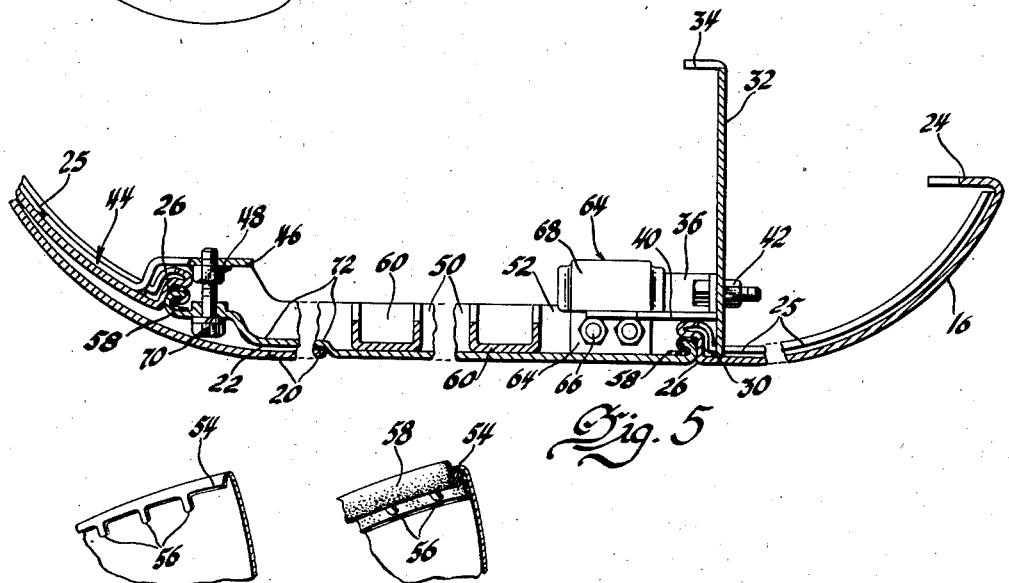
Fig. 5
Fig. 6    Fig. 7
INVENTOR
Edward F. Reynolds
BY
Blackmor, Spencer & Flint
ATTORNEYS Patented Sept. 9, 1947

2,427,160

UNITED STATES PATENT OFFICE 2,427,160

FENDER SHIELD

Edward F. Reynolds, Flint, Mich., assignor to General Motors Corporation, Detroit, Mich., a corporation of Delaware Application November 20, 1944, Serial No. 564,341

8 Claims. (Cl. 280—152)

1

This invention relates to automobile bodies and has particular reference to the rear fenders thereof and the application of a shield or guard over the recess or cut-out in the side of the fenders.

It is well known in the art to provide a large recess or cut-out in the side of the rear fender to enable easy access to the rear wheels to facilitate their removal and it is also well known in the art to provide a supplemental shield or guard which removably fits into the opening and gives an outer smooth contour to the fender and removes the somewhat unsightly appearance of the wheel.

It is the object of the present invention to provide a shield for the more or less rectangularly shaped recess in the rear fender and the novelty of the invention resides in the specific manner of securing the shield in place and in the manner in which a sealing strip is secured to the edge of the shield.

A further object of the invention is to provide a depressed or stepped portion intermediate the length of the fender to enable the edge of the door of the automobile to fit over the fender and into the depression thereby to give a smooth exterior contour to the fender.

On the drawing:

Figure 4 is an enlarged detailed perspective view of the fender separated from the vehicle and without the shield and showing the depression intermediate the length thereof and also showing the front and rear securing means.

Figure 5 is a section on the line 5—5 of Figure 1 with parts broken away.

Figure 6 is a view of a portion of the edge of the shield illustrating the means of securing the sealing strip in place.

Figure 7 is a view similar to Figure 6 but showing the sealing strip secured to the edge of the shield.

Figure 1:
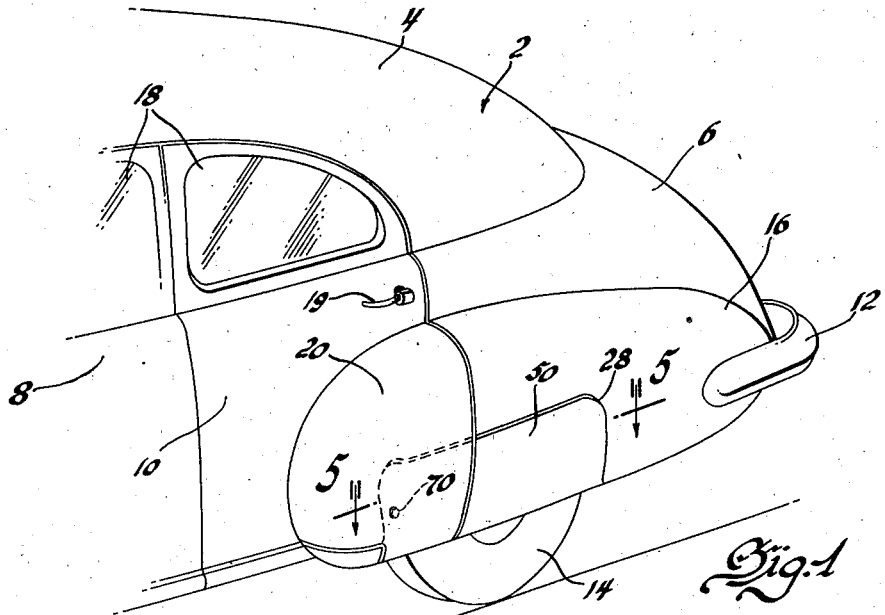
Figure 1 is a perspective view of the rear of an automotive vehicle showing the invention applied to the rear fender.

Referring to the drawing the numeral 2 indicates an automotive vehicle as a whole, the vehicle has the usual top 4, rear deck 6, front door 8, rear door 10, bumper 12, rear wheels 14 and rear fender 16. The doors are provided with the usual windows 18 and the handles 19. The rear door is of somewhat unusual shape and is provided with a bulge or rounded projecting part 20 which extends over the forward end of the rear fender 16.

The rear fender 16 is best shown in detail in Figure 4 and has the depressed or stepped part 22 intermediate its length. This depressed part 22 is for the purpose of enabling the bulge 20 of the door to fit into the fender so that when the door is in closed position as shown in Figure 1 the projection 20 of the door will fit into the stepped part at 22 and form a continuation of the fender to give a smooth exterior contour.

The fender 16 is provided with the usual edge flange 24, by means of which it is secured to the vehicle 2, and with a bottom reinforcing flange 25. The fender is also provided with a recess 26 which is more or less rectangular in shape but has the rounded corners 28. The fender 16 at the recess 26 is provided with the inturned strengthening flange 30 and a reinforcing plate 32 is secured inside the fender immediately adjacent the rear edge of recess 26. The reinforcing plate 32 is provided with the flange 34 by means of which it is secured to the body 2.

The plate 32 has secured thereto immediately to the rear of the recess 26 an angle bracket 36 which has a downwardly inclined end 38. The bracket has an upstanding flange 40 at its outer edge and is secured to the plate 32 by means of the bolt 42.

At the front part of the fender immediately adjacent the recess 26 a second bracket 44 is secured to the interior of the fender such as by welding. This bracket has the stepped part 46 which extends into the recess and there is welded thereto the nut 48.

The fender shield is indicated as a whole at 50. The shield has a contour conforming to the recess 26 and is provided with the lower inwardly extending reinforcing flange 52 and the upper inturned flange 54. The upper flange 54 has formed thereon a plurality of fingers 56, the purpose of which is to secure in place the rubber or fabric sealing strip 58. The fingers 56 pass through the strip and are then bent inwardly against the strip and shield as is shown in Figure 7, firmly to hold the sealing strip 58 into place. The strip 58 preferably extends around the top and two sides of the shield or guard 50.

The shield 50 also has the reinforcing angle irons 60 secured to the flange 52 and to the back of the shield. At the top of each angle iron 60 there is secured an angle bracket 62 which extends underneath the fender and engages with the flange 30 rigidly to hold the shield into position.

The rear end of the shield 50 has secured thereto a U-shaped securing bracket 64 mounted on the flange 52 by means of the bolts and nuts 66, which pass through one leg of the U. The bracket 64 has the upper horizontal leg 68, the inner edge of which is spaced from the plane of the shield 50 as is best shown in Figure 5. The forward edge of the shield 50 has turnably mounted therein a bolt 70. This bolt is preferably mounted in the shield so that it can be freely rotated but cannot be removed. The purpose of this construction is to prevent the loss of the bolt when the shield 50 is removed.

Figure 2:
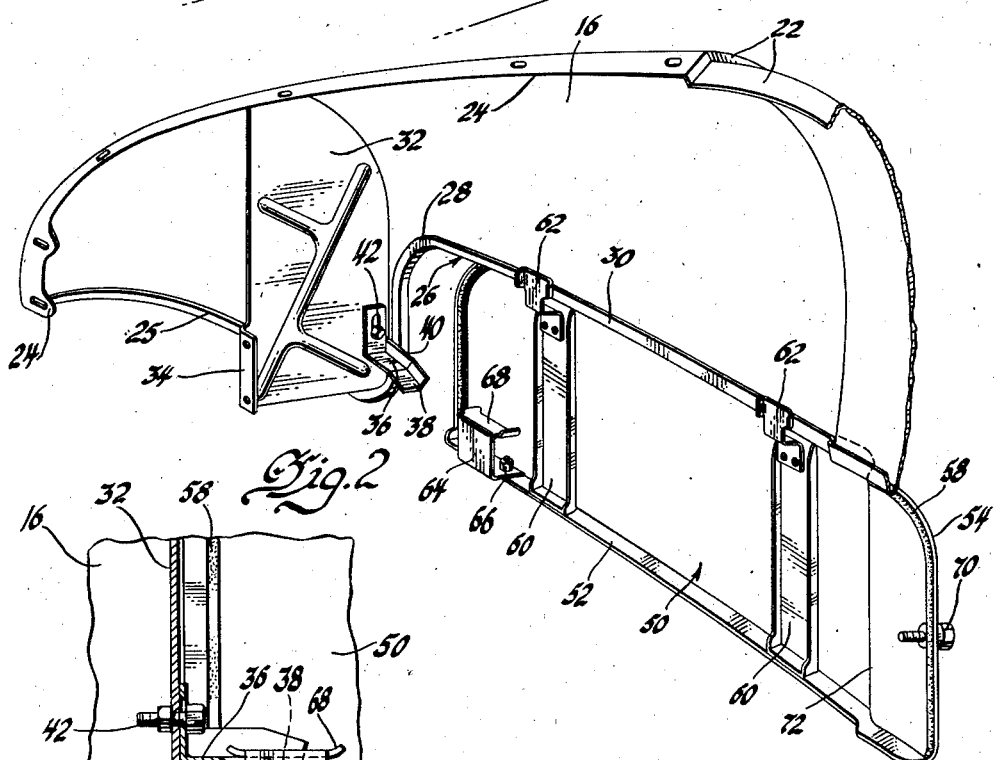
Figure 2 is a perspective view of the fender and shield removed from the automobile and looking at the inside thereof parts being broken away better to illustrate the construction.
Figure 3:
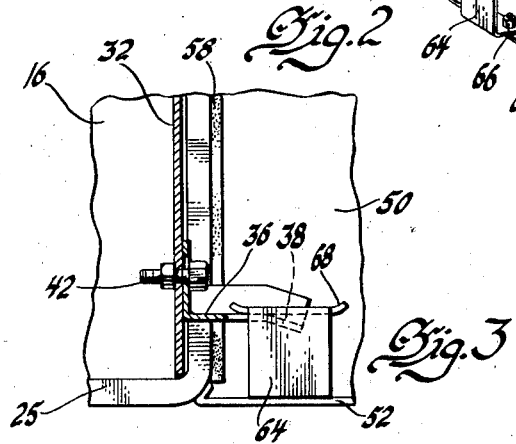
Figure 3 is an enlarged detailed view of the manner of removably securing the rear end of the shield to the fender.

Referring to Figures 2, 3 and 5, the manner in which the rear end of the shield is mounted to the fender is best shown. The shield is first positioned as shown in Figure 2 and then pushed rearwardly to cause the inclined part 38 of the bracket 36 to engage under the leg 68. As the guard or shield 50 is pushed rearwardly the part of the bracket 36 beyond the inclined end 38 will receive the leg 68 and the upright edge 40 of the bracket will be against the edge of the leg 68. The bolt 70 in the final position of the shield 50 is in alignment with the opening of the nut 48 and by applying a suitable tool to the head of the bolt 70 the bolt may be screwed into the nut 48, rigidly but removably to hold the shield on the fender. With the brackets 62 in engagement behind the flange 30, and the bracket 36 in engagement with the bracket 64, and the bolt 70 applied to the nut 48, the sealing strip 58 will be compressed against the edge of the recess 26 to make a tight seal with the fender.

By referring to Figures 3 and 5 it will be noted that the shield has a stepped or offset part 72 which mates with or forms a continuation of the stepped part 22 of the fender so that when the shield or guard 50 is in final position the projecting part 20 of the door will fit into the recessed or stepped part 72 of the shield and conceal the bolt 70 as is shown in Figure 1.

I claim:

1. In a fender shield for application to the fender of an automotive vehicle, said fender having a cut-out to expose the vehicle wheel and said shield adapted to be removably secured to the vehicle fender at the cut-out, a flange on the inner edge of the cut-out part of the fender, a plurality of arms on the shield extending under the fender against the flange and causing the flange to retain the upper edge of the shield against the fender, a bracket secured to the fender and projecting into the cut-out at one end thereof, a cooperating bracket secured to the shield adjacent the lower edge thereof, said brackets adapted to inter-engage when the shield is in position on the fender removably to retain one end of the shield on the fender, and means at the other end of the shield adapted to engage with the fender removably to hold the said other end to the fender.

2. In a fender shield for application to the fender of an automotive vehicle, said fender having a cut-out to expose the vehicle wheel and said shield adapted to be removably secured to the vehicle fender at the cut-out, a plurality of arms on the shield extending under the fender at its edge to enable the upper edge of the shield to be retained against the fender, a bracket secured to the fender and projecting into the cut-out at one end thereof, a cooperating bracket secured to the shield adjacent the lower edge thereof, said brackets adapted to inter-engage when the shield is in position on the fender removably to retain one end of the shield on the fender, means at the other end of the shield adapted to engage with the fender removably to hold the said other end to the fender, an inturned edge on the shield, and a strip of yieldable material secured to the inturned edge and adapted to abut against the fender when the shield is in position.

3. In a fender shield for application to the fender of an automotive vehicle, said fender having a cut-out to expose the vehicle wheel and said shield adapted to be removably secured to the vehicle fender at the cut-out, a plurality of arms on the shield extending under the fender at its edge to enable the upper edge of the shield to be retained against the fender, a transverse reinforcing plate secured to the fender adjacent one end of the cut-out adapted to be secured to the vehicle body, a bracket secured to said reinforcing plate, a cooperating bracket secured to the shield, said brackets adapted to interengage when the shield is in position on the fender removably to retain one end of the shield on the fender, and means at the other end of the shield adapted to engage with the fender removably to hold the said other end to the fender.

4. In combination with a fender shield for application to the fender of an automotive vehicle having a door, said fender having a cut-out to expose the wheel of the vehicle and enable its ready removal, said cut-out being adapted removably to receive the fender shield, means to secure the fender shield over the cut-out to conceal the wheel under the fender including a detachable securing means adjacent one end of the shield, said door in its closed position extending over one end of the shield to conceal the said detachable securing means.

5. In combination with a fender shield for application to the fender of an automotive vehicle having a door, said fender having a cut-out to expose the wheel of the vehicle and enable its ready removal, said cut-out being adapted removably to receive the fender shield, means to secure the fender shield over the cut-out to conceal the wheel under the fender including a detachable securing means adjacent one end of the shield, an offset in the fender, an offset in the shield mating with the offset in the fender, said door in its closed position extending over one end of the fender and the shield and fitting into the offsets into flush relation with the exterior of the fender, said door in its closed position concealing said detachable securing means and the ends of the fender and the shield.

6. In combination with a fender shield for application to the fender of an automotive vehicle, said fender having a cut-out to expose the vehicle wheel and said shield adapted to be removably secured to said fender at the cut-out, means to detachably secure said shield against the fender, a sealing strip of yieldable material adapted to seal the joint between said shield and fender, and means to secure said sealing strip to said shield including a plurality of fingers on the marginal edge of said shield which pass through said sealing strip and are bent to hold said strip in place on said shield.

7. In combination with a fender shield for application to the fender of an automotive vehicle, said fender having a cut-out to expose the vehicle wheel and said shield adapted to be removably secured to said fender at the cut-out, means at the upper edge of the shield adapted to extend under the fender at the cut-out therein to retain the upper edge of the shield against the fender, a bracket secured to the fender adjacent its lower edge extending longitudinally of the fender adjacent one end of the cut-out, a cooperating bracket secured to the shield, said brackets being adapted to be slidably inter-engaged by a longitudinal movement of the shield within the cut-out in the fender to support and retain one end of the shield against the fender, and means to detachably secure the other end of the shield to the fender.

8. The elements set forth in claim 7 in which a portion of the bracket secured to the fender is inclined downwardly to cause the shield to move upwardly within the cut-out as the shield is being moved longitudinally therein.

EDWARD F. REYNOLDS.

REFERENCES CITED

The following references are of record in the file of this patent:

UNITED STATES PATENTS

| Number | Name | Date |
|---|---|---|
| 2,161,160 | Harroun et al. | June 6, 1939 |
| 2,257,556 | Webb | Sept. 30, 1941 |
| 2,261,376 | Jandus | Nov. 4, 1941 |
| 2,336,536 | Fergueson | Dec. 14, 1943 |
| 2,352,374 | Fergueson et al. | June 27, 1944 |
| 2,239,373 | Schatzman et al. | Apr. 22, 1941 |
| 2,352,421 | Wohlfield | June 27, 1944 |